US010424959B2

(12) United States Patent
Kim et al.

(10) Patent No.: US 10,424,959 B2
(45) Date of Patent: Sep. 24, 2019

(54) ELECTRONIC APPARATUS, METHOD FOR CONTROLLING CHARGE AND COMPUTER-READABLE RECORDING MEDIUM

(71) Applicant: Samsung Electronics Co., Ltd., Suwon-si, Gyeonggi-do (KR)

(72) Inventors: Bong-chul Kim, Seoul (KR); Ashish Khandelwal, Suwon-si (KR); Sung-rok Bang, Hwaseong-si (KR); Jason Michael Battle, Suwon-si (KR); Sanoop Ramachandran, Kozhikode (IN); Jae-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 15/270,365

(22) Filed: Sep. 20, 2016

(65) Prior Publication Data
US 2017/0256973 A1 Sep. 7, 2017

(30) Foreign Application Priority Data

Mar. 3, 2016 (KR) .................. 10-2016-0025741

(51) Int. Cl.
H02J 7/00 (2006.01)
(52) U.S. Cl.
CPC ............ H02J 7/0068 (2013.01); H02J 7/007 (2013.01); H02J 7/0073 (2013.01); H02J 2007/0098 (2013.01); Y02B 40/90 (2013.01)
(58) Field of Classification Search
CPC .................................................. H02J 7/0068
(Continued)

(56) References Cited

U.S. PATENT DOCUMENTS

2003/0006735 A1* 1/2003 Kawakami ........... G01R 31/361
320/133
2003/0076074 A1* 4/2003 Kawai .................. H02J 7/0075
320/136
(Continued)

FOREIGN PATENT DOCUMENTS

EP 2 506 025 A1 10/2012
JP 2012-222878 A 11/2012
(Continued)

OTHER PUBLICATIONS

Extended European Search Report dated Dec. 10, 2018, issued in European Application No. 16892797.8.
(Continued)

Primary Examiner — Suchin Parihar
(74) Attorney, Agent, or Firm — Jefferson IP Law, LLP

(57) ABSTRACT

An electronic apparatus for charging a battery with an optimum charge profile corresponding to a pattern of use and a state of the battery is provided. The electronic apparatus may include a power supply configured to supply power to respective components of the electronic apparatus using power of a battery, and when receiving an input of power from an external adaptor, to charge the battery using the inputted power, and a processor configured to fully charge and discharge the battery to thus generate a charge curve and a discharge curve expressed in time and charge amount, and control the power supply to charge the battery using a charge profile corresponding to the generated charge curve and discharge curve.

19 Claims, 14 Drawing Sheets

(58) Field of Classification Search
 USPC .......................................................... 320/128
 See application file for complete search history.

(56) References Cited

U.S. PATENT DOCUMENTS

| | | | | |
|---|---|---|---|---|
| 2003/0206021 | A1* | 11/2003 | Laletin | G01R 31/3631 324/426 |
| 2007/0210742 | A1* | 9/2007 | Brecht | H02J 7/0091 320/104 |
| 2007/0279010 | A1 | 12/2007 | Okamura et al. | |
| 2008/0007221 | A1 | 1/2008 | Lee | |
| 2011/0285356 | A1 | 11/2011 | Maluf et al. | |
| 2013/0066573 | A1* | 3/2013 | Bond | G01R 31/3679 702/63 |
| 2013/0187657 | A1* | 7/2013 | Yen | G01R 31/3606 324/427 |
| 2013/0214730 | A1 | 8/2013 | Lu et al. | |
| 2014/0002008 | A1 | 1/2014 | Chung | |
| 2014/0100708 | A1* | 4/2014 | Ukita | H02J 3/32 700/297 |
| 2014/0125348 | A1 | 5/2014 | Ben-Aicha et al. | |
| 2014/0132202 | A1 | 5/2014 | Kam et al. | |
| 2014/0172333 | A1 | 6/2014 | Gopalakrishnan et al. | |
| 2014/0239964 | A1* | 8/2014 | Gach | H02J 7/0021 324/433 |
| 2015/0022160 | A1 | 1/2015 | Greening et al. | |
| 2015/0048803 | A1 | 2/2015 | Noh et al. | |
| 2015/0123595 | A1 | 5/2015 | Hussain et al. | |
| 2015/0226809 | A1* | 8/2015 | Joe | G01R 31/3606 324/426 |
| 2015/0268304 | A1* | 9/2015 | Yonetani | H02J 7/007 320/134 |
| 2016/0126762 | A1* | 5/2016 | Verdun | H02J 7/007 320/162 |
| 2016/0190827 | A1* | 6/2016 | Ezawa | H02J 7/0021 320/107 |
| 2016/0195589 | A1* | 7/2016 | Hanyu | G01R 31/3651 702/63 |
| 2016/0197382 | A1* | 7/2016 | Sood | G01R 31/3679 429/92 |
| 2016/0204639 | A1 | 7/2016 | Honkura et al. | |
| 2016/0378165 | A1* | 12/2016 | Krishnappa | G06F 1/3287 713/320 |
| 2017/0212169 | A1* | 7/2017 | Wang | G01R 31/3634 |

FOREIGN PATENT DOCUMENTS

| | | |
|---|---|---|
| KR | 10-2014-0003973 A | 1/2014 |
| KR | 10-2014-0062270 A | 5/2014 |
| KR | 10-2015-0019295 A | 2/2015 |
| WO | 2015/045015 A1 | 4/2015 |

OTHER PUBLICATIONS

Alessandro Sassone et al: "Modeling of the charging behavior of li-ion batteries based on manufacturer's data", VLSI, ACM, 2 Penn Plaza, Suite 701 New York NY 10121-0701 USA, May 20, 2014 (May 20, 2014), pp. 39-44, XP058049194.

* cited by examiner

ELECTRONIC APPARATUS, METHOD FOR CONTROLLING CHARGE AND COMPUTER-READABLE RECORDING MEDIUM

CROSS-REFERENCE TO RELATED APPLICATION(S)

This application claims the benefit under 35 U.S.C. § 119(a) of a Korean patent application filed on Mar. 3, 2016 in the Korean Intellectual Property Office and assigned Serial number 10-2016-0025741, the entire disclosure of which is hereby incorporated by reference.

TECHNICAL FIELD

The present disclosure relates to an electronic apparatus, a method for controlling charge, and a computer-readable recording medium. More particularly, the present disclosure relates to an electronic apparatus, a method for controlling charging, and a computer-readable recording medium capable of charging a battery with an optimum charge profile that corresponds to a pattern of use and a state of the battery.

BACKGROUND

Many recent electronic apparatuses have embedded batteries to allow a user to carry these electronic apparatuses around. In order to use these electronic apparatuses, consistent charging is necessary.

However, a related battery charging method involves charging with a fixed voltage or current, irrespective of the state of the battery and environment of use. Accordingly, problems occur when the charging takes a long time or the service life of the batteries is shortened.

Further, a related battery charging method does not consider the user's pattern of charging. For example, when a user connects a battery to a charger before going to bed, charging continues to a fully-charged state. However, as a fully-charged battery discharges as time goes, the charger continuously and periodically charges the battery. Accordingly, unnecessary power consumption occurs. Specifically, considering such a short time between charging and full charge, power consumption at the charger after full charge increases.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus capable of charging a battery with an optimum charge profile corresponding to a pattern of use and a state of the battery, a charge control method, and a computer-readable recording medium.

In accordance with an aspect of the present disclosure, an electronic apparatus is provided. The electronic apparatus includes a power supply configured to supply power to respective components of the electronic apparatus using power of a battery, and when receiving an input of power from an external adaptor, to charge the battery using the inputted power, and a processor configured to fully charge and discharge the battery to thus generate a charge curve and a discharge curve expressed in time and charge amount, and control the power supply to charge the battery using a charge profile corresponding to the generated charge curve and discharge curved.

When the charge amount of the battery corresponds to a preset first magnitude or higher, the processor may fully charge the battery, discharge the fully-charged battery to thus generate the discharge curve, and when the battery is fully discharged, charge the battery to thus generate the charge curve.

The processor may generate the discharge curve and the charge curved at or below a preset discharge speed and charge speed.

The electronic apparatus may additionally include a display configured to display a state of progress on the work of the charge curve and the discharge curve.

The processor may generate at least one battery state information among capacity information of the battery, lifespan information, information on time taken for charging, using the generated charge curve and discharge curve.

In accordance with another aspect of the present disclosure, an electronic apparatus is provided. The electronic apparatus includes a communicator configured to transmit the generated charge curve and discharge curve to an external apparatus, and in which, when receiving a charge profile in response to the transmission of the charge curve and the discharge curve, the processor controls the power supply to charge the battery using the received charge profile.

The processor may generate a plurality of charge profiles corresponding to a plurality of charge modes, respectively, using the generated charge curve and the generated discharge curve.

When receiving power from the external adaptor, the processor may determine a charge mode based on a state of a charge of the battery and pre-stored user's pattern information, and control the power supply to charge the battery with a charge profile corresponding to the determined charge mode.

The charge mode may include at least one of high-speed charge mode, lifespan-extension charge mode, and power-save charge mode.

The high-speed charge mode may be a charge mode in which a plurality of charge segments are divided according to the state of the charge of the battery, and a charge profile may be used such that, for each of the divided charge segments, different target voltages and a target current, which is determined by 'the different target voltages and a preset power consumption', are provided to the battery.

The lifespan-extension charge mode may use a charge profile in which time of changing current is varied in a default charge profile based on the lifespan of the battery.

The power-save charge mode may be a charge mode that uses a charge profile having a charge idle segment.

The charge idle segment may be a segment determined according to preset time of ending charging and time necessary for charging the battery.

The charge idle segment may be allocated in an initial stage of the battery charging or allocated when a charge capacity of the battery exceeds a preset capacity.

In accordance with another aspect of the present disclosure, a method for controlling charge of an electronic apparatus is provided. The method includes fully charging and discharging a battery to thus generate a charge curve and a discharge curve expressed in time and charge amount, generating a charge profile by using the generated charge curve and discharge curved, and charging the battery by providing constant voltage or constant current to the battery using the generated charge profile.

The generating the charge curve and the discharge curve may include, when the charge amount of the battery corresponds to a preset first magnitude or higher, fully charging the battery, discharging the fully-charged battery to thus generate the discharge curve, and when the battery is fully discharged, charging the battery to thus generate the charge curve.

The charging may include, when being inputted with power from an external adaptor, determining a charge mode based on a state of the charge of the battery and pre-stored user's pattern information, and charging the battery with a charge profile corresponding to the determined charge mode.

The charge mode may include a high-speed charge mode in which a plurality of charge segments are divided according to the state of the charge of the battery, and a charge profile is used such that, for each of the divided charge segments, different target voltages and a target current, which is determined by 'the different target voltages and a preset power consumption', are provided to the battery.

The charge mode may include a power-save charge mode that uses a charge profile having a charge idle segment determined in accordance with preset time of ending charging and time necessary for charging the battery.

In accordance with another aspect of the present disclosure, a non-transitory computer readable recording medium including program is provided, in which driving of the program implements a controlling method including fully charging and discharging a battery to thus generate a charge curve and a discharge curve expressed in time and charge amount, generating a charge profile by using the generated charge curve and discharge curved, and charging the battery by providing constant voltage or constant current to the battery using the generated charge profile.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression such as "first," "second," and so on may be used to describe a variety of elements, but should not be limited therein. The terms are used solely for the purpose of distinguishing one element from the other.

The terms used herein are for the purpose of explaining a certain embodiment, and not to limit the scope of the present disclosure. A singular expression, unless otherwise specified, may encompass a plural expression. Terms such as "comprise" or "consist of," as used herein, designate a presence of a characteristic, a number, a step, an operation, an element, a part, or a combination of these, and not to preclude the presence or possibility of addition of one or more other characteristics, numbers, steps, operations, elements, parts, or a combination of these.

In the various embodiments, a 'module' or a 'unit' may perform at least one function or operation, and may be implemented as hardware or software or a combination of hardware and software. Further, a plurality of 'modules' or a plurality of 'units' may be integrated into at least one module and implemented as at least one processor (not illustrated) except for a 'module' or a 'unit' that needs to be implemented as specific hardware.

Hereinbelow, the present disclosure will be described in greater detail with reference to the accompanying drawings.

Figure 1:
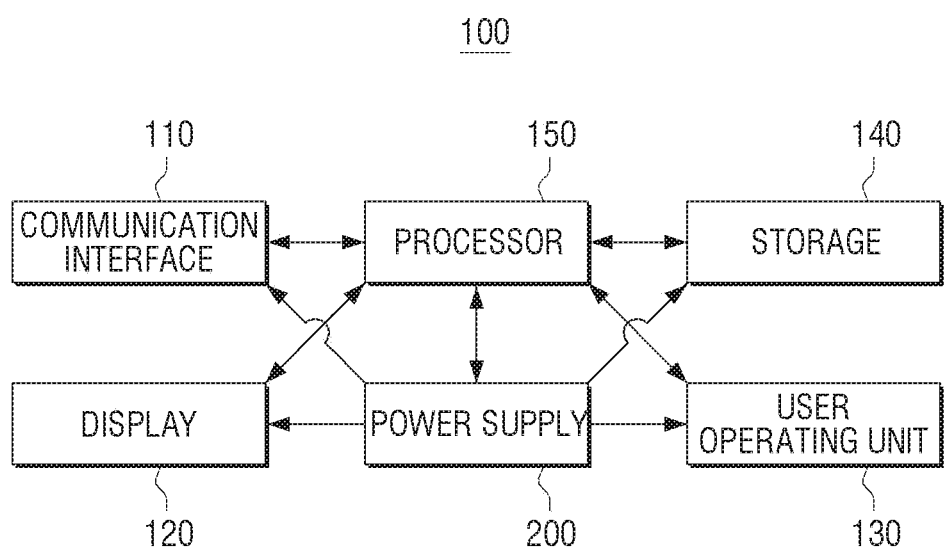
FIG. 1 illustrates a configuration of an electronic apparatus according to an embodiment of the present disclosure.

FIG. 1 is a block diagram illustrating a configuration of an electronic apparatus according to an embodiment of the present disclosure.

Referring to FIG. 1, the electronic apparatus 100 according to an embodiment includes a communication interface 110, a display 120, a user operating unit 130, a storage 140, a processor 150, and a power supply 200. The electronic apparatus 100 may be a portable television (TV), a laptop computer, a tablet, a moving picture experts group (MPEG)-2 Audio Layer III (MP3) player, a smartphone, a portable phone, and portable media player (PMP), and so on that can operate with a battery.

The communication interface 110 is formed to connect the electronic apparatus 100 to an external apparatus (not illustrated), and may take a form that can be connected to the external apparatus via local area network (LAN), and the internet, or it may be connected with a mobile communication system (e.g., Global System for Mobile Communications (GSM), Universal Mobile Telecommunications System (UMTS), long-term evolution (LTE), Wireless Broadband (WiBRO), and so on).

The communication interface 110 may transmit a charge curve and a discharge curve generated at a controller to the external apparatus (not illustrated). Alternatively, the communication interface 110 may transmit battery state information that corresponds to the generated charge curve or discharge curve to the external apparatus (not illustrated). Further, the communication interface 110 may receive a charge profile corresponding to the transmitted charge curve or discharge curve or corresponding to the battery state information from the external apparatus. Meanwhile, in actual implementation, the communication interface 110 may receive a plurality of charge profiles corresponding to a plurality of charge modes. The 'charge profile' as used herein refers to stepwise representation of manner of charging (e.g., constant current manner, constant voltage manner, and so on), a target voltage and a target current.

The display 120 may represent a variety of information generated at the electronic apparatus 100. The display 120 may be implemented as an apparatus such as cathode ray tube (CRT), liquid crystal display (LCD), organic light-emitting diode (OLED), active matrix OLED (AMOLED), and so on that displays an image, and may also be implemented as a touch screen that can perform the function of the user operating unit 130 to be descried below.

The display 120 displays the state of the charge (SOC) of the battery. In this case, the display 120 may display estimated charge completion time information.

The display 120 may then display a user interface (UI) to receive an input from a user including a notification message regarding a need for precision scanning of the battery, or a command to perform a precision battery scan. The 'precision battery scan' as used herein refers to an operation of charging and discharging the battery at a preset speed to generate a charge curve and a discharge curve representing time and charge amount.

During the precision battery scan, the display 120 may display the work progress status (e.g., current status reports on time information such as a time for executing a precision battery scan, estimated time consumption, estimated finish time, and so on).

When the precision battery scan is finished, the display 120 may display the completion. Further, the display 120 may display the result of precision battery scan, that is, the battery state information (battery capacity, estimated lifespan information, and so on).

The display 120 may then display a UI to receive from the user an input of pattern of use. The time for completing a full-charge as desired by the user may be one example of the pattern of use of the user, which may be directly inputted by the user. Meanwhile, in actual implementation, an alarm time as set at the electronic apparatus 100, a pre-stored event generating information (e.g., time at which an event of separation of the electronic apparatus 100 and the adaptor occurs, and so on) may be utilized.

The user operating unit 130 may include a plurality of function keys with which the user can set or select a variety of functions supported by the electronic apparatus 100, and may receive an input of a variety of commands from the user. The user operating unit 130 may be implemented as an input apparatus such as a keyboard, a mouse, a touch pad, a button, and so on, or may be implemented as a touch screen that can also perform a function of the display 120 described above.

The user operating unit 130 may receive a precision battery scan command. Further, the user operating unit 130 may receive an input of the information on the battery charge pattern as time information. In actual implementation, such time information may utilize alarm information set at the electronic apparatus 100, and utilize the behavior of the user (e.g., time of separating electronic apparatus) when this is recorded.

The storage 140 is a memory device that stores programs and data necessary for the processor 150 during operation of the electronic apparatus 100. The storage 140 may directly access a memorized location to read and write according to the command from the processor 150.

Further, the storage 140 stores programs for driving of the electronic apparatus 100. Specifically, the storage 140 may store programs as a set of various instructions necessary during driving of the electronic apparatus 100. The storage 140 may be read-only memory (ROM), random access memory (RAM), a hard disk drive (HDD), a solid state disk or solid state drive (SSD), and so on.

Further, the storage 140 may store a charge application that supports the manner of charging according to an embodiment. The charge application may be automatically driven upon connecting of an external adaptor to the electronic apparatus 100, and the power supply 200 (to be described) may perform the precision battery scan according to controlling of the charge application, or charge the battery according to a charge manner according to an embodiment.

Further, the storage 140 may store a lookup table of charge profiles. The lookup table herein refers to a mapping table that stores a plurality of state information, and charge table values corresponding to a plurality of state information. Such a lookup table may be managed by the charge application described above. That is, the charge application described above may perform communication with an external server, and from such communication, may receive the lookup table described above and store the same at the storage 140. Further, the charge application may periodically update the lookup table described above.

The processor 150 performs controlling of respective components within the electronic apparatus 100. Specifically, the processor 150 may be at least one processor that performs arithmetic operations, and with the supply of power according to a turn-on command, may load the operating system (O/S) stored at the storage 140 to the RAM and boot the system according to a command stored at the ROM. When the boot completes, the processor 150 may control the electronic apparatus 100 to perform an operation (or service) corresponding to a user command as inputted through the user operating unit 130. Further, the processor 150 may control the display 120 such that a screen according to execution of the operation or service may be displayed.

Further, when an adaptor is connected in a wiry manner or a connection signal is inputted from an adaptor supporting a wireless charging method, the processor 150 may drive the charge application, and may control the battery charging operation of the power supply 200 according to the charge method as determined by the corresponding charge application. Specifically, the processor 150 may determine a constant-current (CC) charge method, a constant-voltage (CV) charge method, a target voltage, a target current, and so on, and may determine an idle segment (or idle time) during the charging process. A detailed charging method according to an embodiment will be described below with reference to FIGS. 2 and 3.

The processor 150 may determine if a battery scan is necessary. Specifically, the processor 150 may determine that the battery scan is necessary when a preset period (e.g., one month) has come and when it is time to perform the precision battery scan. In such cases, when preset conditions are met, the processor 150 may directly perform the precision battery scan, and control the display 120 such that a request for the user to confirm is performed.

Meanwhile, even when the time condition is met, the processor 150 may allow the precision battery scan to be performed only when the state of the battery corresponds to a preset condition. Specifically, immediately after the precision battery scan, it is desirable that the state of the battery is the fully-charged state in order for the user to use the electronic apparatus. In other words, it is desirable that a discharging operation is performed in the fully-charged state to thus generate a discharge curve, after which the charging operation is performed to thereby generate a charge curve. Further, considering that the battery has to be in a fully-charged state for the discharging operation to be performed first, it is desirable that the precision battery scan is performed when the battery is close to a fully-charged state. Accordingly, the processor 150 may perform the precision battery scan when the state of the charge of the battery is a preset state of the charge (e.g., 80%).

Meanwhile, while it was exemplified that the precision battery scan is performed automatically when the preset condition is met, in actual implementation, the processor 150 may perform the precision battery scan based also on a manual command from the user.

Further, when the charge curve and the discharge curve are generated, the processor 150 may generate a charge profile that corresponds to the charge and discharge curves as generated. Specifically, the processor 150 may calculate battery state information that corresponds to the charge and discharge curves, and generate a battery charge profile based on the calculated battery state information. In this case, the processor 150 may utilize a lookup table regarding a plurality of state information and the charge profiles corresponding to the plurality of state information. Such a lookup table may be stored at the storage 140.

Further, the processor 150 may control the communication interface 110 such that the generated charge and discharge curves are transmitted to the external apparatus, and may receive a charge profile from the external apparatus and use the same. In actual implementation, the processor 150 may transmit battery state information instead of the charge and discharge curves, and receive a charge profile corresponding to the battery state information and use the same.

Further, the processor 150 determines a charge mode when connected with an external adaptor. Specifically, when connected with the external adaptor, the processor 150 may determine a charge mode based on the state of the charge of the battery, and pre-stored user pattern information. More specifically, based on the user's pattern of charge, the processor 150 may first determine whether to use a power-save charge mode or to use high-speed charge mode or life-extension mode. In order to use the high-speed charge mode or the life-extension mode, the processor 150 may determine whether to proceed in the high-speed charge mode or the life-extension mode, based on the state of the charge of the battery.

For example, when the state of the charge of the battery is less than 50% and it is currently day time, the processor 150 may determine that the charge mode is a high-speed charge mode that requires fast charging. The 'high-speed charge mode' as used herein refers to a charge mode that utilizes a multistep-based charge profile that allows battery charging with maximum efficiency. The 'multistep-based charge profile' as used herein refers to a charge profile in which the entire charge segment is divided into a plurality of charge segments, with each of the charge segments providing a different target voltage, and a target current as determined by 'targeted charge voltage and preset power consumption' to the battery. This will be described below with reference to FIGS. 4A to 4C.

Meanwhile, when the state of the charge of the battery is approximately 70% or higher, the processor 150 may determine the charge mode to be a normal charge mode that does not require fast charging. The 'normal charge mode' as used herein refers to a profile generated based on the lifespan state of the battery. The charge profile for use in such a normal charge mode can be similar to the general related profile, but with the difference that the target current and the target current application time are optimized for the battery state.

Meanwhile, when the state of the charge of the battery is lower than 50% and it is currently late night time, the processor 150 may determine the charge mode to be the power-save charge mode. The 'power-save charge mode,' as used herein, refers to a charge profile that includes an idle segment during which the charging operation is not performed. This will be described below with reference to FIGS. 8 to 10.

The processor 150 may then control the power supply 200 such that the charging operation is performed based on the charge profile corresponding to the determined charge mode.

The power supply 200 supplies power to the respective components within the electronic apparatus 100, using externally-provided power (e.g., adaptor power), and power charged at the battery unit. Specifically, when connected to the adaptor, the power supply 200 may provide the power provided from the adaptor to the respective components of the electronic apparatus 100.

In such an example, when the battery needs charging, the power supply 200 may charge the battery. Specifically, the power supply 200 may charge the battery using the determined charge profile.

Meanwhile, when the adaptor is not connected, the power supply 200 may supply the power charged at the battery to the respective components within the electronic apparatus 100. The detailed configuration and operation of the power supply 200 will be described below with reference to FIG. 2.

As described above, the electronic apparatus 100 can increase the lifespan of the battery while reducing the charging time because the electronic apparatus 100 charges the battery using an optimum charge profile according to the pattern of use and the state of the battery. Further, since the electronic apparatus 100 charges the battery while having an idle segment based on the pattern of use, the electronic apparatus 100 can reduce power consumption that would otherwise be generated at the charger after full battery charge.

Meanwhile, in illustrating and describing FIG. 1, the power supply is illustrated and described as an internal component of the electronic apparatus 100. However, the power supply may be implemented as an independent apparatus that is distinguished from the electronic apparatus 100. For example, the power supply may be a portable auxiliary battery used for providing power to a general electronic apparatus. In this case, the operation of the process for generating charge profiles as described above may be performed at the power supply.

Meanwhile, although simple configuration of the electronic apparatus is illustrated and described with reference to FIG. 1, in actual implementation, a variety of configurations may be added. For example, an electronic apparatus such as a television that receives and displays a broadcast signal, a tuner to receive the broadcast signal, a decoder to process an image, and so on may be additionally included.

Meanwhile, as explained with reference to FIG. 1, the processor 150 may generate charge and discharge curves, and generate the charge profile, and the power supply 200 may use the charge profile generated at the processor 150. However, various embodiments are not limited to this specific example only. Accordingly, in actual implementation, the power supply 200 may generate the charge and discharge curves and generate the charge profile. An example like this will be described in detail below with reference to FIG. 2.

Figure 2:
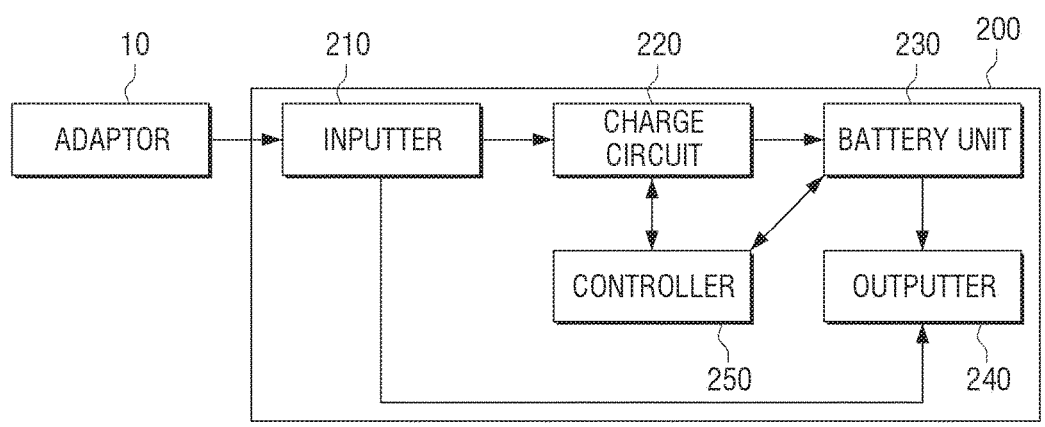
FIG. 2 illustrates a detailed configuration of the power supply of FIG. 1 according to an embodiment of the present disclosure.

FIG. 2 is a diagram illustrating the detailed configuration of the power supply 200 of FIG. 1 according to an embodiment of the present disclosure.

Referring to FIG. 2, the power supply 200 may be composed of an inputter 210, a charge circuit 220, a battery unit 230, an outputter 240, and a controller 250. The power supply 200 may be implemented as one component within the electronic apparatus 100, and may be implemented as an independent apparatus (e.g., portable battery apparatus). In this example, the power supply 200 may be referred to as a power supply device, a battery device, and so on.

The inputter 210 receives direct current (DC) power from an external adaptor 10. In this case, the inputter 210 may include a terminal to be physically connected to the external adaptor 10. Meanwhile, while it is exemplified herein that the DC power is inputted from the external adaptor 10, alternating current (AC) power may be inputted instead. In this case, the charge circuit 220 to be described below may include a rectification circuit to convert the inputted AC power into DC power.

Upon being inputted with the power from the external adaptor 10, the charge circuit 220 charges the battery of the battery unit 230 with the inputted power. Specifically, the charge circuit 220 may include a DC-to-DC converter (specifically, a buck type converter), and so on to convert the DC power provided from the inputter 210 into a constant current of a preset size and provide the same to the battery to be described below, or to convert the DC power provided into a constant voltage of a preset size and provide the same to the battery, according to the control of the controller 250.

In this case, the charge circuit 220 may provide different constant currents to the battery for each of the charge segments to be described below. The 'constant current' as used herein refers to a fixed current value of the power being supplied, in which the supplied current may vary depending on the state of the battery.

The battery unit 230 includes a battery, i.e., a secondary battery such that the secondary battery is charged with the constant current or voltage provided through the charge circuit 220. The battery may be a nickel battery, a cadmium battery, a nickel-cadmium battery, a nickel-hydrogen battery, a lithium-ion battery, a lithium-ion polymer battery, and so on.

Further, the battery unit 230 may provide the power to the respective components within the electronic apparatus 100 through the outputter 240.

The outputter 240 supplies power to the respective components within the electronic apparatus 100. Specifically, the outputter 240 may selectively supply the power inputted through the inputter 210 or the power of the battery unit 230 to the respective components within the electronic apparatus 100, or alternatively, may supply both the power inputted through the inputter 210 and the power of the battery 230 to the respective components within the electronic apparatus 100.

The controller 250 performs controlling of the respective components within the power supply 200. Specifically, the controller 250 may be implemented as a processor such as central processing unit (CPU), application-specific integrated circuit (ASIC), and so on that can load pre-stored operation algorithm, or operation algorithm stored at a memory device to operate.

Further, the controller 250 may determine if a battery scan is necessary. Specifically, when a preset period (e.g., one month) has come and that it is time to perform the precision battery scan, the controller 250 may determine that the battery scan is necessary. When determining that the battery scan is necessary, the controller 250 may alert the processor 150 such that the user is notified that the precision battery scan is necessary. Meanwhile, although it is exemplified in this embodiment that the controller 250 determines a need for the precision battery scan, in actual implementation, this operation may be performed at the processor 150.

The controller 250 then performs the precision battery scan. Specifically, the controller 250 may charge and discharge the battery at a preset speed to generate a charge curve and a discharge curve. The preset speed may be 1 coulomb (C) or lower.

Further, when the charge curve and the discharge curve are generated, the controller 250 may generate a charge profile that corresponds to the generated charge curve and discharge curve. Specifically, the controller 250 may calculate the battery state information corresponding to the charge curve and the discharge curve, and generate a battery charge profile corresponding to the calculated battery state information by using a pre-stored lookup table. Alternatively, the controller 250 may transmit the generated charge curve and discharge curve to an external apparatus or transmit the calculated battery state information to the external apparatus, and receive a charge profile from the external apparatus.

In this case, the controller 250 may generate a plurality of charge profiles. Specifically, the controller 250 may generate a high-speed charge profile for fast charging, a lifespan-based charge profile for use in circumstances other than high-speed charging, a power-save charge profile including a charge idle segment, and so on.

Further, the controller 250 detects the state of the charge of the battery unit 230. Specifically, the controller 250 may sense the voltage of the battery, a charge capacity of the battery, and so on. The controller 250 may provide the sensed state of the charge to the controller 150.

The controller 250 may detect whether or not power is inputted from the adaptor 10, and when the adaptor 10 is connected, the controller 250 may determine whether or not the battery is charged. Specifically, when the voltage value or the state of the charge of the battery equals a preset state or above, the controller 250 may determine that a charging operation is not performed (even when the adaptor 10 is connected), while below the preset state, the controller 250 may control the charge circuit 220 to charge the battery with the power provided from the adaptor 10.

When determining that the adaptor 10 is connected and that the battery is to be charged, the controller 250 determines the charge mode. Specifically, when the external adaptor is connected, the controller 250 may determine the charge mode based on the state of the charge of the battery, and the previously-stored user's pattern information.

The controller 250 may then control the charge circuit 220 to perform the charging operation based on the charge profile corresponding to the determined charge mode. Specifically, during the high-speed charge mode, the controller 250 may determine a charge segment that corresponds to the current state of the charge of the battery among a plurality of charge segments, and determine a target voltage and a target current that correspond to the determined charge segment. The 'charge segments' may have different target voltages and target currents.

For example, when the full charge voltage of the battery is 10V and the minimum voltage is 7V, the controller 250 may determine a plurality of charge segments (e.g., 8V, 9V, 10V) that are composed of voltage values lower than 10V. The full charge voltage of the battery may vary depending on the types and the manner of coupling of the battery such that these values are provided herein only for examples and may change. Further, while the embodiment described above divides the charge segment into three segments, the charge segment may be divided into two segments only, or may also be divided into four or more segments.

The controller 250 determines the target current corresponding to the determined target voltage. The 'target current' as used herein refers to a value that is determined by the determined target voltage and a preset power consumption. Accordingly, the target current may be determined by dividing the preset power consumption by the target voltage. For example, when the preset power consumption is 80 W and the determined target voltage is 8V, the controller 250 may determine the target current with 80/8=10 A. When the determined target voltage is 10V, the controller 250 may determine the target current with 80/10=8 A.

The controller 250 may control the charge circuit 220 such that the constant current corresponding to the determined target voltage and target current by the processes described above is provided to the battery. For example, the controller 250 may control the charge circuit 220 such that the first constant current is provided to the battery up to the first target voltage corresponding to the state of the charge, and when the first target voltage is achieved, may control the charge circuit 220 such that the second constant current less than the first constant current is provided to the battery up to the second target voltage that is higher than the first target voltage.

When the voltage of the battery is saturated with the provision of the constant current such that a specific voltage is maintained, the controller 250 may control the charge circuit 220 such that the constant voltage is provided to the battery. Specifically, the controller 250 may charge the battery in the same manner as the related CC and CV charging methods, and then charge the battery with the CV method.

Figure 9:
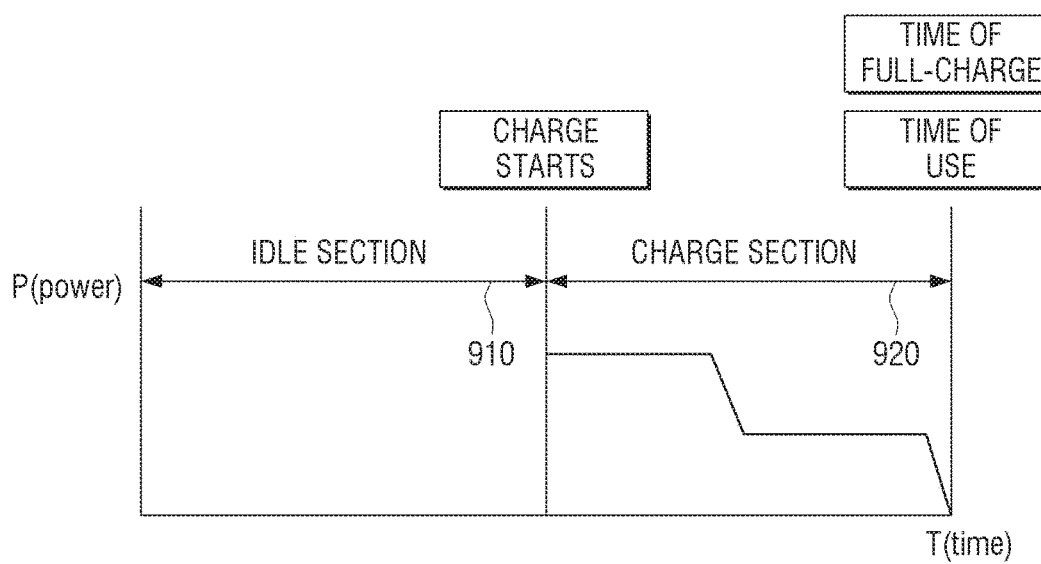

Meanwhile, when the charge mode is a power-save charge mode, the controller 250 may determine a charge idle segment according to the preset charge end time and time necessary for the battery charge. For example, as illustrated in FIG. 9, the controller 250 may determine a time of initiating charging such that full charge is achieved at the time of use by the user, control the charge circuit 220 such that the charging operation is not performed until the time of initiating charging, and control the charge circuit 220 such that the charging is performed according to the charge profile from the time of initiating charging.

As described above, the power supply 200 may charge the battery using an optimum charge profile according to the pattern of use and the state of the battery, and therefore, can increase the lifespan of the battery and reduce the charging time. Further, since the power supply 200 includes the idle segment in charging the battery based on the pattern of use, it is possible to reduce power consumption generated at the charger after the battery is fully charged.

Meanwhile, in illustrating and describing FIG. 2, it was exemplified that the power supply 200 receives power in a wired manner and charges the battery. However, considering the recent trend of using wireless charging method, it is to be understood that the battery can be charged in a wireless charging manner. This will be described below with reference to the embodiment of FIG. 11.

Figure 3:
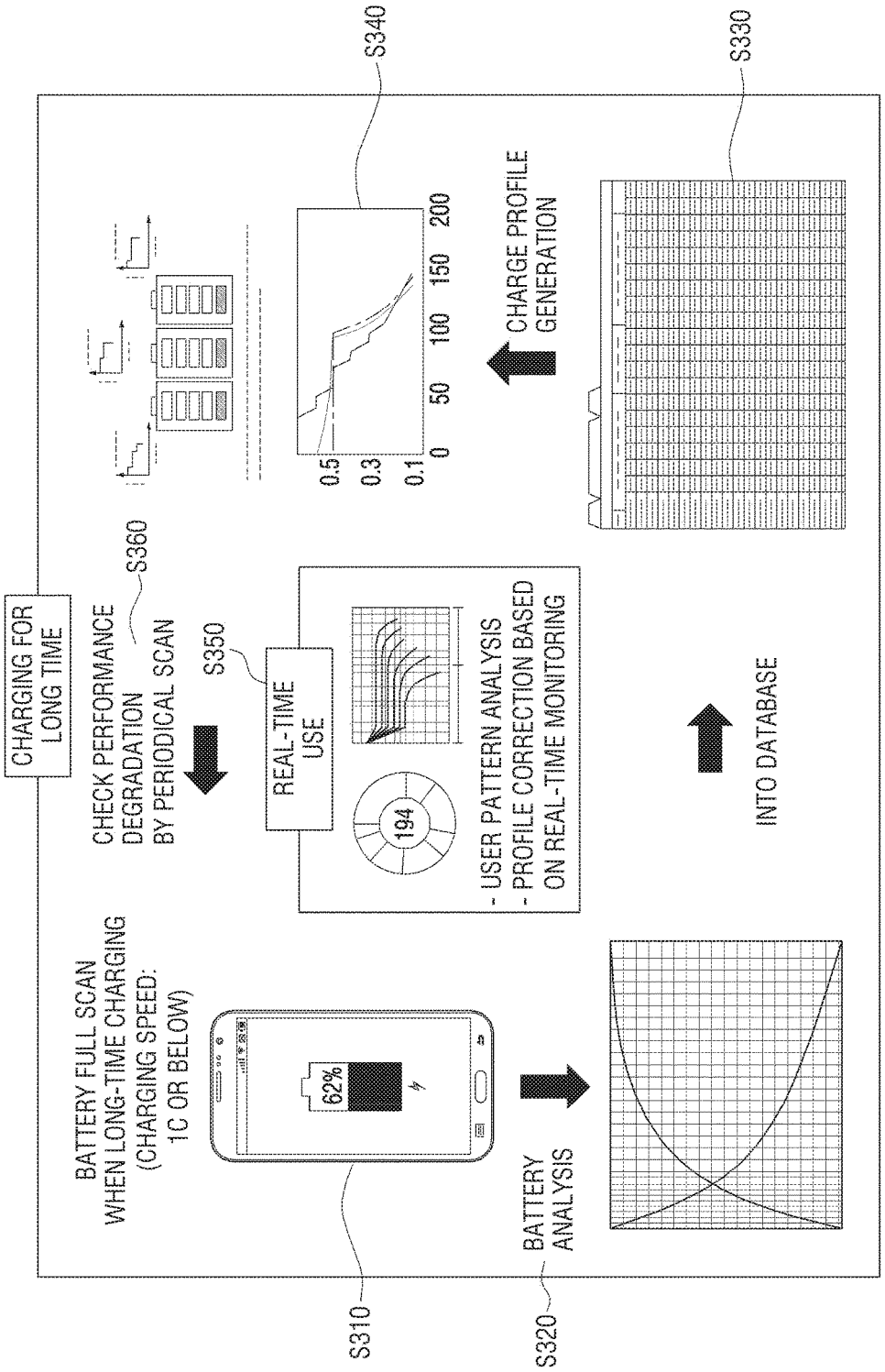
FIG. 3 illustrates a process of generating a charge profile according to an embodiment of the present disclosure.

FIG. 3 is a diagram illustrating a process of generating a charge profile according to an embodiment of the present disclosure.

Referring to FIG. 3, at operation S310, a time for performing the precision battery scan is determined. Specifically, when a preset period has come and when the state of the charge of the battery corresponds to a preset state, it may be determined that the precision battery scan is performed.

When it is determined that the precision battery scan is to be performed, first of all, the battery is fully charged. At operation S320, the battery is then analyzed with full-charge and discharging operations. Specifically, it is possible to generate a discharge curve by discharging the battery at or below a preset speed (e.g., 1 C). When the battery reaches a fully-discharged state or a preset charge capacity (e.g., 1% or below), power may be provided to charge at a preset speed such that the charge curve may be generated. The 'discharge curve' and 'charge curve' as used herein are sets of values that represent the states of a charge of the battery over time. Although the term 'curve' is used in expressing the discharge curve and the charge curve, in actual implementation, the discharge curve and the charge curve may be expressed as tabulated values rather than graphs.

At operation S330, the values of the discharge curve and the charge curve described above are used to populate a database and stored, and at operation S340, the charge profile is generated using the database and stored discharge curve and the charge curve. A specific method of generating the charge profile will be described below with reference to FIGS. 5 to 7.

At operations S350 and S360, the charge profile may be corrected by reflecting the work environment of the user, or degradation of the battery performance may be checked by periodically using the work described above, and the charge profile may be generated by reflecting the same.

As described above, rather than using the charge profile provided by default, embodiments may use the charge profile that is generated as a result of performing the precision battery scan on the current state of the battery. Accordingly, an optimized charging operation can be performed.

For example, the lifespan of the battery degrades as the frequency of use increases. Further, the optimum constant current and voltage values necessary for charging are varied accordingly. In a related method, charging is performed with only one charge profile provided in an initial stage such that use of such a charge profile in an aged battery that is used over a predetermined time can further exacerbate the shortening lifespan of the battery. However, the present disclosure using the charge profile corresponding to the changes in the state of the battery can enhance the lifespan of the battery.

Further, use of the charge profile optimized for the changed battery state can also enhance the charge speed.

Figure 4A:
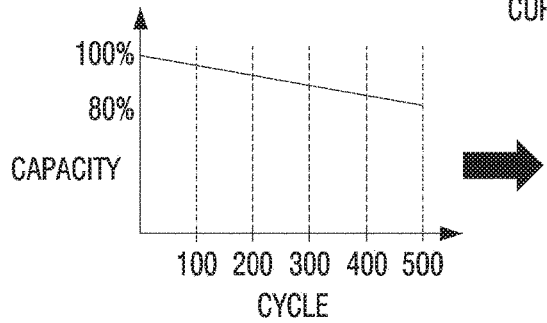
FIGS. 4A to 4C illustrate an example of the charge profile as generated according to various embodiments of the present disclosure.
Figure 4B:
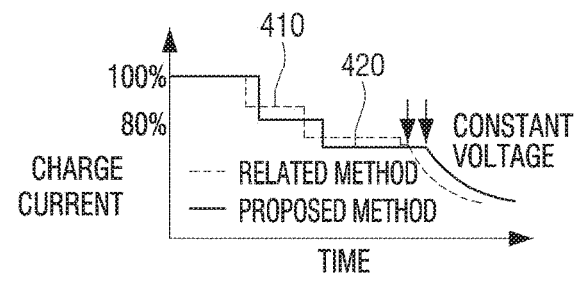
Figure 4C:
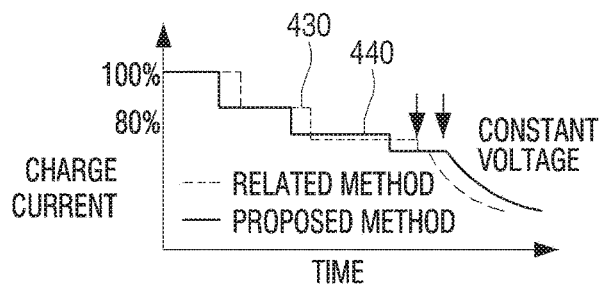

FIGS. 4A to 4C are diagrams illustrating an example of the generated charge profile according to various embodiments of the present disclosure.

FIG. 4A illustrates changes in the battery capacity according to a frequency of charging, FIG. 4B illustrates a charge profile changed as the lifespan is reduced by 5%, and FIG. 4C illustrates a charge profile changed as the lifespan is reduced by 15%.

Referring to FIG. 4A, it is observed that the charge capacity is reduced as the frequency of charging the battery increases.

Meanwhile, when the charge curve and the discharge curve are generated, the charge capacity of the battery can be known using the generated charge curve and discharge curve. When such an operation is performed periodically, it is possible to know the changes in the charge capacity by comparing the initially-stored charge capacity with the currently-measured charge capacity, and it is also possible to estimate the lifespan of the battery.

The power supply 200 may generate a new charge profile corresponding to the changed charge capacity. Specifically, referring to FIGS. 4B and 4C, while the related method uses the same charge profiles 410, 430 irrespective of the changed charge capacity, the embodiment of the present disclosure changes the charge profiles 420, 440 according to the changes in the charge capacity.

Accordingly, in an embodiment, changes in the capacity of the battery are sensed, and the charge profile of the battery is changed and used, which thereby allows a more optimized charge speed in the current state. Further, since charging is performed in a manner that is not detrimental to the changed battery state, battery lifespan can be enhanced.

Figure 5:
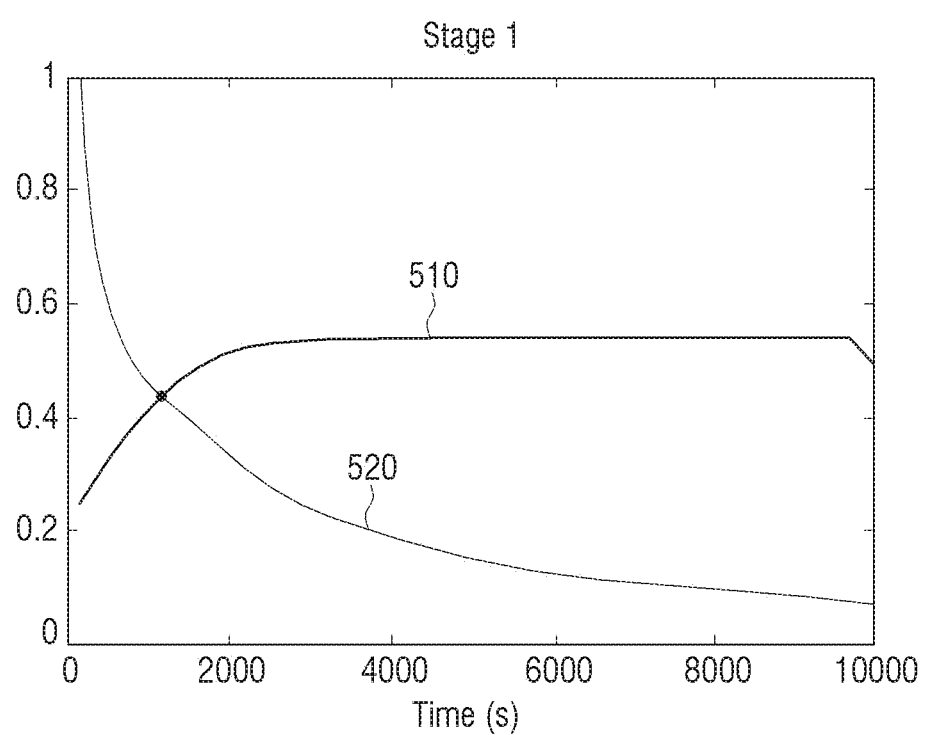
FIGS. 5 to 7 are diagrams provided to explain a method for generating a charge profile according to various embodiments of the present disclosure.
Figure 6:
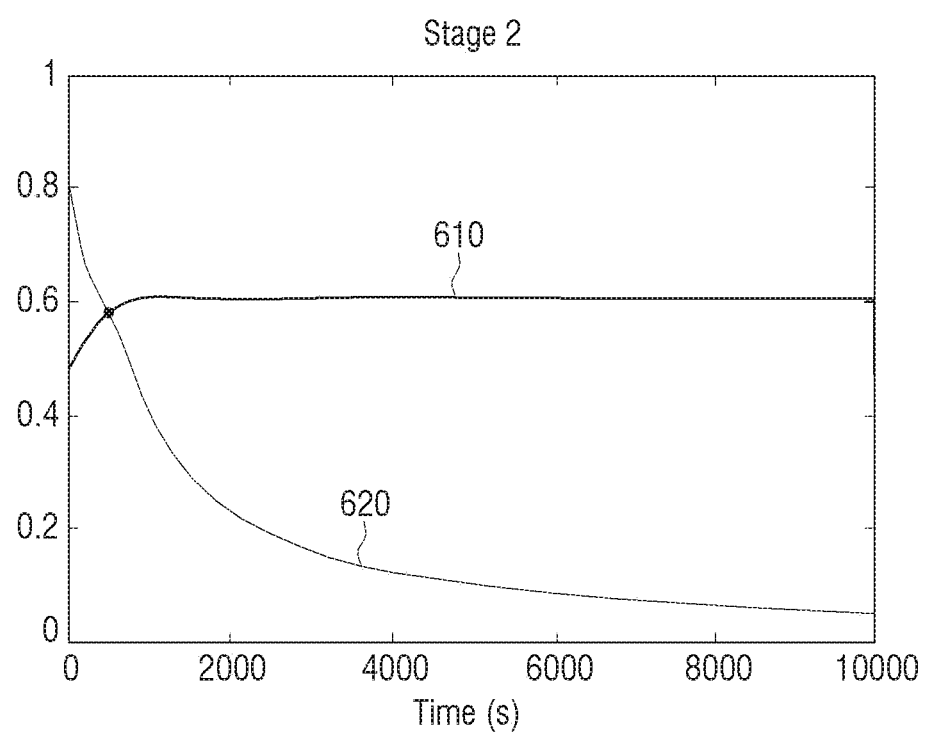
Figure 7:
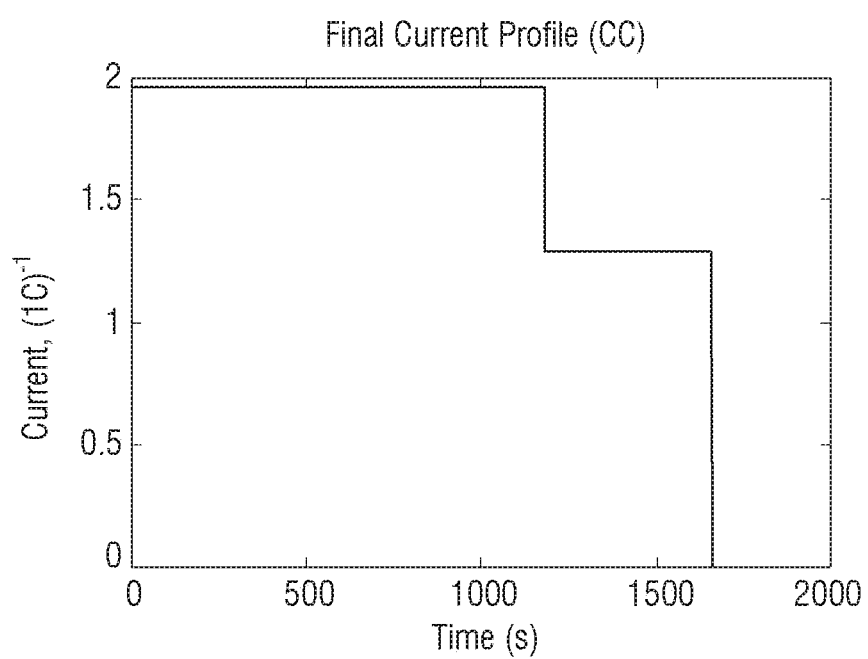

FIGS. 5 to 7 are diagrams provided to explain an example of a method of generating a charge profile according to various embodiments of the present disclosure.

Specifically, FIGS. 5 and 6 illustrate charge amounts 510, 610 and current curves 520, 620 regarding time. The current curves 520, 620 used herein are graphs representing the magnitude of the current reaching the cutoff voltage, and charge amounts 510, 610 are graphs representing the charge amounts measured at a negative electrode.

First, the time of reaching the cutoff voltage according to available charge current mount is found.

When the time of reaching the cutoff voltage is found, an intersection of the design curves is found, using the numerical approach as illustrated in FIGS. 5 and 6.

Once the intersection is found, it is determined whether or not the current battery state equals the target battery state, and if not, the process described above is repeated.

When the current battery state and the target battery state are equal, an incremented target constant current and a target time are determined, and the optimum charge profile may be generated as illustrated in FIG. 7.

Figure 8:
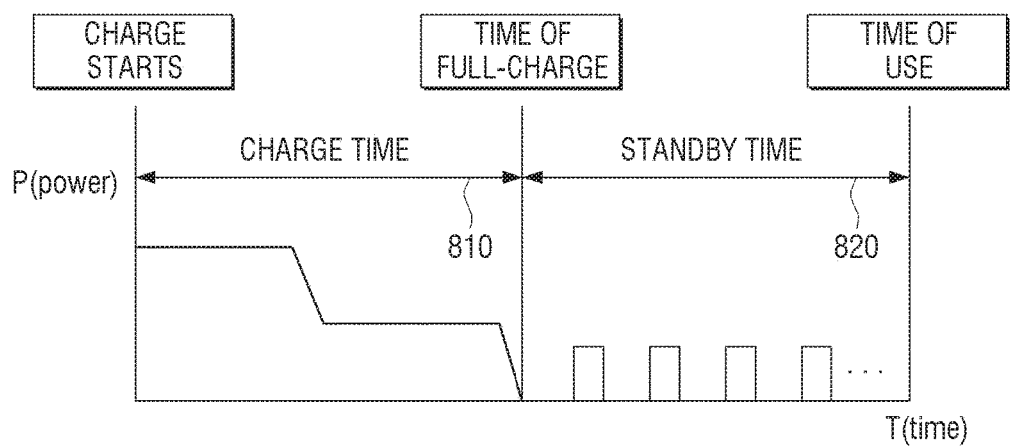
FIGS. 8 to 10 are diagrams provided to explain a power save charge mode according to various embodiments of the present disclosure.
Figure 10:
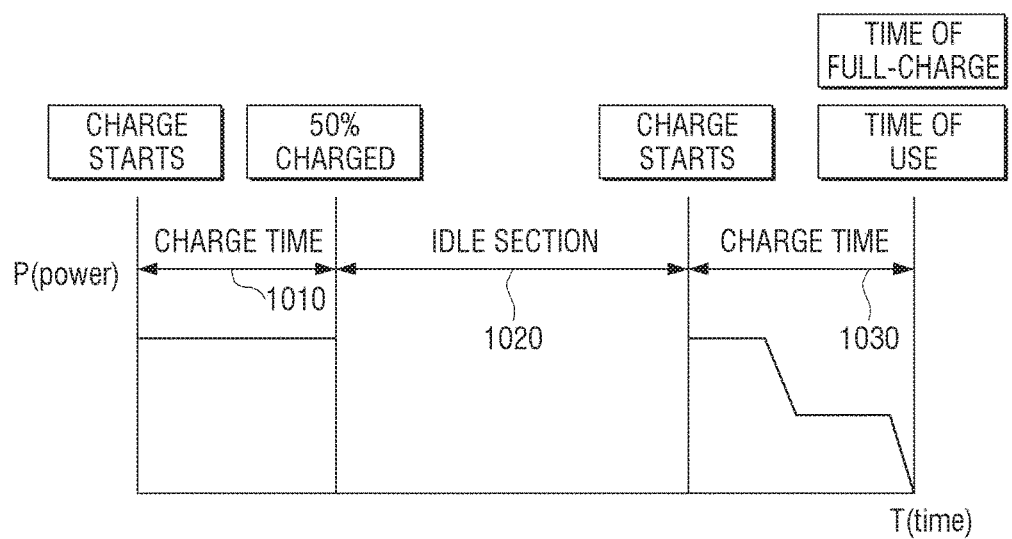

FIGS. 8 to 10 are diagrams provided to explain a power-save charge mode according to various embodiments of the present disclosure.

Specifically, FIG. 8 illustrates the state of the charge shown when a related general charge profile is used.

Referring to FIG. 8, when the user going to bed connects the electronic apparatus to a charger, charging is immediately started upon connecting of the electronic apparatus with the default charge profile until the battery is fully charged, as shown at 810.

The electronic apparatus consumes the battery once the battery is fully charged, and when the state of the charge of the battery is dropped below a preset state (e.g., 95%), according to the related technology, the battery is automatically charged. Accordingly, at 820, intermittent charging operations are performed during a standby time between the time of full charge and the time of use by the user. That is, unnecessary power consumption is generated at the charger even after full charge.

FIGS. 9 and 10 illustrate a manner of charging during power-save charge mode according to embodiment various embodiments of the present disclosure.

Referring to FIG. 9, when the time of use is previously set and the electronic apparatus 100 knows the time taken for charging, the electronic apparatus 100 being connected to the charger takes an idle segment rather than directly performing charging, at 910. The 'time of use' as used herein may be an alarm time as set by the user, or set time information as designated by the user.

When the preset time of initiating charging has come after the idle segment, charging of battery is performed, at 920. Accordingly, the time of ending the charging operation is equal to the time of use by the user, and since unnecessary charging and discharging operations are not performed after charging, power consumption can be reduced.

While the embodiment described above exemplifies that the idle segment is allocated in the initial segment, in actual implementation, the idle segment may be allocated in an intermediate segment. Specifically, the user may unexpectedly use the electronic apparatus. The charging method corresponding to this is shown in FIG. 10.

Referring to FIG. 10, when the battery state of the electronic apparatus 100 is a preset state (e.g., 50% or below), first, charging operation is performed until the preset state is reached, at 1010. The operation after that is shown in FIG. 9. That is, since the time of use by the user is preset, considering the preset time of use and remaining charging time, charging is not performed after the first charging during an idle section 1020 until a time of initiating charging, as previously described with respect to FIG. 9. Then a second charging is performed, at 1030, when the time of initiating charging comes. That is, charging is initiated before the time of use, for the time of charging 50% to 100%.

As such, the time of ending the charging of the battery in the example of FIG. 10 is equal to the time of use by the user, and power consumption can be reduced as unnecessary charging and discharging operations after charging are saved.

Figure 11:
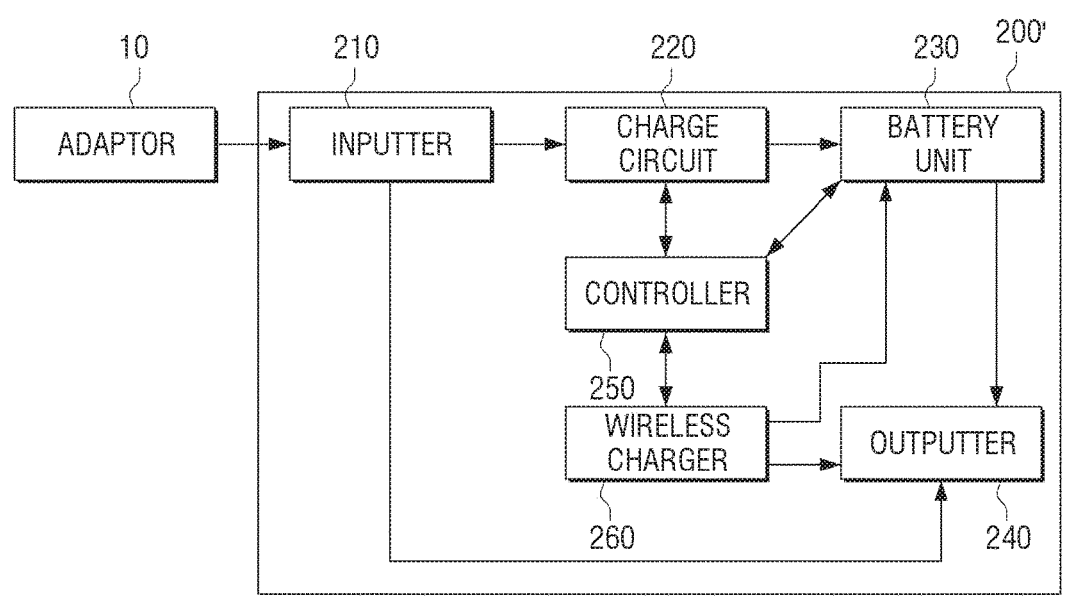
FIG. 11 illustrates a detailed configuration of a power supply according to an embodiment of the present disclosure.

FIG. 11 illustrates a detailed configuration of the power supply according to an embodiment of the present disclosure.

Referring to FIG. 11, the power supply 200' may be composed of an inputter 210, a charge circuit 220, a battery unit 230, an outputter 240, a controller 250, and a wireless charger 260.

The configuration of the inputter 210, the charge circuit 220, the battery unit 230, and the outputter 240 will not be redundantly described below, as these are already described above.

The wireless charger 260 wirelessly receives magnetic energy from an external adaptor 10 and converts the received magnetic energy into preset magnitude of power. Specifically, the wireless charger 260 may operate in either an induction method or a resonance method, and convert magnetic energy delivered from the external adaptor 10 in the manner described above into electrical energy.

The wireless charger 260 may then generate a constant current or a constant voltage corresponding to the charging method using a DC-to-DC converter (not shown) for the converted electrical energy, and provide the generated result to the battery unit 230.

When perceiving reception of electrical energy through the wireless charger 260, the controller 250 senses the state of the charge of the battery unit 230 and determines whether or not wireless charging is necessary. When the result of the determination indicates the wireless charging to be unnecessary, the controller 250 may control the wireless charger 260 to stop the transmission of the magnetic energy.

When the battery charging is necessary, the controller 250 may control the wireless charger 260 such that the wireless charger 260 generates the constant current or constant voltage corresponding to the current charge segment among a plurality of charge segments described above.

As described above, the power supply 200' according to an embodiment charges the battery using the optimum charge profile even for the wirelessly-provided power. Accordingly, battery lifespan is increased, and charging time is reduced. Further, since the power supply 200' charges the battery while having an idle segment based on the pattern of use, power consumption generated at the charger after full battery charge can be reduced.

Meanwhile, as illustrated in FIG. 11, the power supply 200' may provide the power also in a wired manner, but in actual implementation, the external power may be inputted only in the wireless charging manner, i.e., without requiring components such as the inputter 210 and the charge circuit 220.

Figure 12:
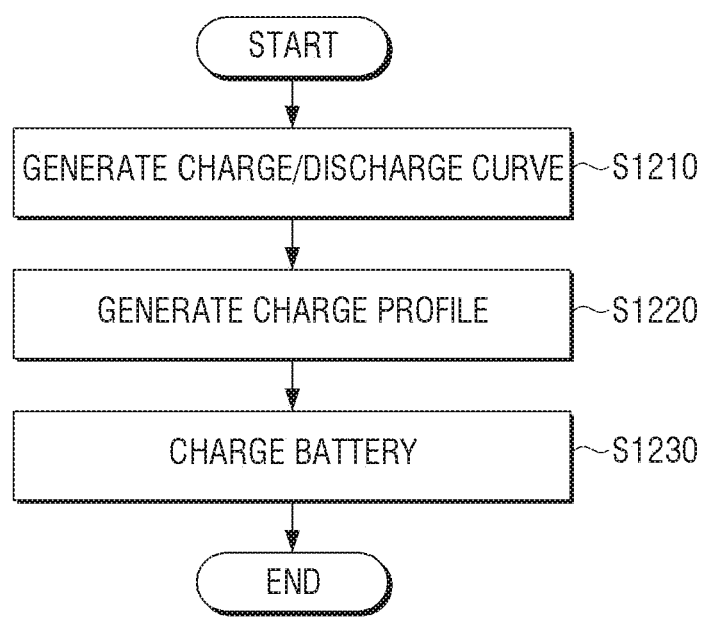
FIG. 12 is a flowchart provided to explain a charge control method according to an embodiment of the present disclosure.

FIG. 12 is a flowchart provided to explain a method of controlling the charging of an electronic apparatus according to an embodiment of the present disclosure.

Referring to FIG. 12, first, at operation S1210, the battery is fully charged and discharged such that the charge curve and discharge curve, expressed as charge amounts over time, are generated. Specifically, when it is time for the precision battery scan, the battery is first fully charged. Then it is possible to generate a discharge curve by discharging the battery at a preset discharge speed. After the generation of the discharge curve, the battery may be charged at a preset charge speed and thus the charge curve may be generated.

At operation S1220, the charge profile is generated using the generated charge curve and discharge curve. Specifically, using the generated charge curve and discharge curve, the state information of the battery may be generated, and using the generated battery state information and a pre-stored lookup table, the charge profile may be generated. Meanwhile, in actual implementation, the charge curve and discharge curve may be transmitted to an external apparatus, or the battery state information may be transmitted to the external apparatus, and then the corresponding charge profile may be received from the external apparatus for use thereof.

At operation S1230, the constant voltage or the constant current is provided to the battery using the generated charge profile, to thus charge the battery.

With the charge control method according to the embodiment described above, the battery is charged with the optimum charge profile according to the pattern of use and the battery state. Accordingly, battery lifespan is increased, and the charging time can be decreased. Further, the charge control method according to the embodiment charges the battery while having an idle segment based on the pattern of use. Accordingly, power consumption generated at the charger after the battery is fully charged can be reduced. The charge control method as the one illustrated in FIG. 12 may be implemented on an electronic apparatus having the configuration of FIG. 1, or on the power supply apparatus having the configuration of FIG. 2 or FIG. 11, or on an electronic apparatus or power supply apparatus having other configurations.

Further, the charge control method described above may be implemented as a program (or an application) including algorithms executable on a computer, and the program may be stored and provided on a non-transitory computer readable medium. For example, the program may be implemented as an application which can be stored on a server such as an app store. The application stored on the server may be downloaded by the user to be installed on the electronic apparatus.

The 'non-transitory computer readable medium' refers to a medium capable of semi-permanently storing data rather than storing data for a short period of time such as register, a cache, a memory, and so on, and readable by a machine. Specifically, a variety of applications or programs as described above may be stored on the non-transitory computer readable medium such as compact disc (CD), a digital versatile disk (DVD), a hard disk, a Blu-ray disc, a universal serial bus (USB), a memory card, ROM, and so on and provided.

Figure 13:
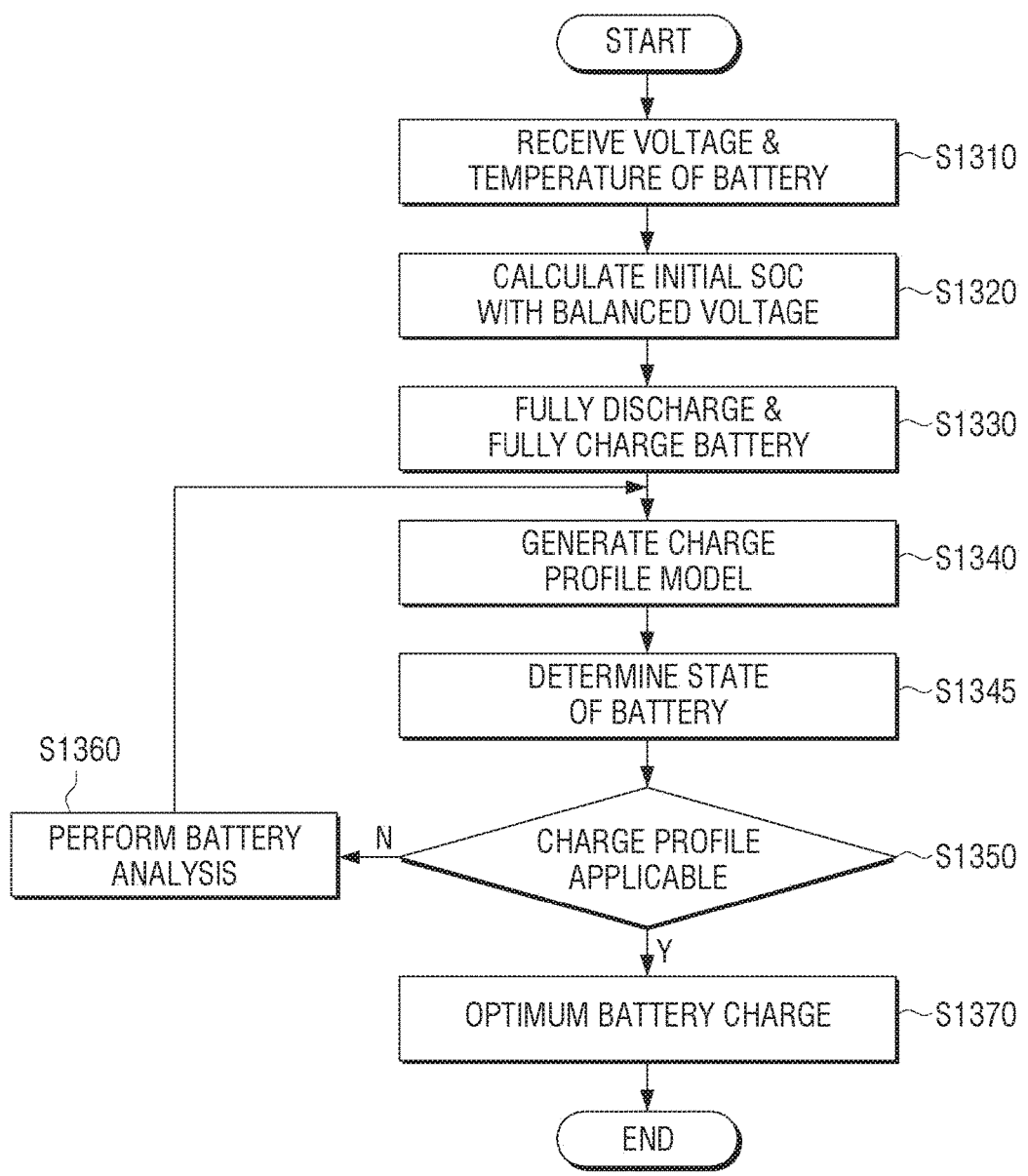
FIG. 13 is a flowchart further illustrating the method of FIG. 12 in more detail according to an embodiment of the present disclosure.

FIG. 13 is a flowchart further illustrating in detail the charge control method of the electronic apparatus of FIG. 12 according to an embodiment of the present disclosure.

Referring to FIG. 13, at operation S1310, the controller of the electronic apparatus receives a voltage and a temperature of the battery from the battery.

At operation S1320, an initial state of the charge (SOC) of the battery is calculated using a balanced voltage.

At operation S1330, after the calculation, the battery may be fully discharged and fully charged such that a discharge curve and a charge curve are generated. Specifically, the discharge curve may be generated as a result of discharging at or below a preset discharge speed (e.g., 1C), and after the generation of the discharge curve, the charge curve may be generated as a result of charging at or below a preset charging speed.

At operation S1340, the charge profile may be generated using the generated discharge curve and charge curve. The operation for forming the charge profile will not be redundantly described below, as this has already been described above.

When the charge profile is generated and the adaptor is connected, at operation S1345, the state of the battery is determined and, at operation S1350, it is determined whether or not the previously generated charge profile is applicable. At operation S1350-Y, when the result of the determination indicates that it is possible to use the generated charge profile for the current battery, at operation S1370, the battery is charged by using the generated charge profile.

At operation S1350-N, when the current battery state is different from the time at which the charge profile was generated, at operation S1360, analysis on the current battery (specifically, the process of generating discharge and charge curves by fully discharging and fully charging the battery), and then the process of generating the charge profile as described above may be repeated.

Figure 14:
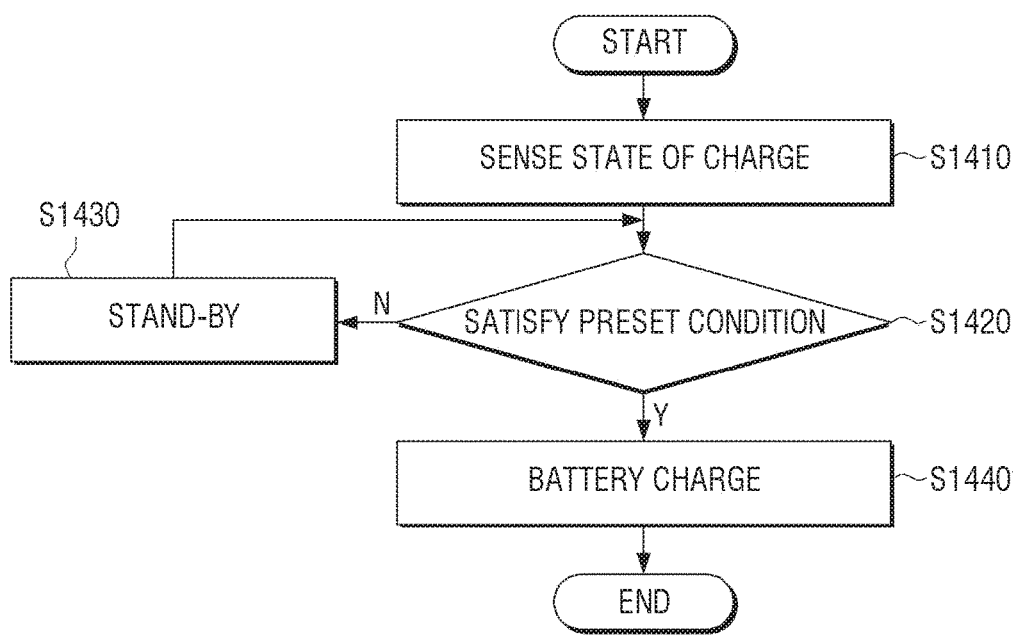
FIG. 14 is a flowchart provided to explain a charge control method according to an embodiment of the present disclosure.

FIG. 14 is a flowchart provided to explain a charge control method of an electronic apparatus according to an embodiment of the present disclosure.

Referring to FIG. 14, first, the state of the charge of the battery is determined, at operation S1410. Specifically, the magnitude of the battery voltage, the charge rate, and so on may be determined, and then a time for initiating charging may be calculated using information such as the previously stored time of use, and so on.

At operation S1420, it is determined whether or not preset conditions for initiating charging are met. The 'preset condition' as used herein may be the arrival of the calculated time for initiating charging. Further, the preset charging rate (e.g., 50%) may also be the preset condition.

At operation S1420-N, when the time for initiating charging has not arrived, at operation S1430, charging is not performed and a standby state is maintained. At this time, the electronic apparatus does not charge the battery, and accordingly, unnecessary power consumption does not occur at the external adaptor.

At operation S1440, when the time for initiating charging has come after maintaining the standby state, the charging operation may be performed using the preset charge profile. Specifically, a first constant current may be provided to the battery up to a first target voltage that corresponds to the state of the charge, and when the first target voltage is achieved, a second constant current lower than the first constant current may be provided to the battery up to a second target voltage that is higher than the first target voltage. When the second target voltage is the final target voltage, after provision of the second constant current described above, that is, after the battery voltage becomes the final target voltage, the battery may be charged in CV manner.

As described above, the charge control method according to an embodiment employs an idle segment based on the pattern of use in charging the battery, and accordingly, power consumption generated at the charger after fully charging the battery can be reduced. The charge control method as the one illustrated in FIG. 12 may be implemented on the electronic apparatus having the configuration illustrated in FIG. 1, or on the power supply apparatus having the configuration illustrated in FIG. 2 or FIG. 11, or on an electronic apparatus or power supply apparatus having other configurations.

Further, the charge control method described above may be implemented as a program (or application) including algorithms executable on a computer, and the program may be stored and provided on a non-transitory computer readable medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a battery;
a power supply;
a memory; and
a processor configured to:
fully charge the battery to obtain a charge curve expressed in time and an amount of charge current,
discharge the battery to obtain a discharge curve expressed in time and an amount of charge current,
obtain a state information of the battery based on the obtained charge curve and the obtained discharge curve,
obtain a charge profile corresponding to the state information of the battery among a plurality of charge profiles stored in the memory, and
control the power supply to charge the battery using the charge profile,
wherein the processor is further configured to obtain battery state information including capacity information of the battery, lifespan information, and information on a time taken for charging, using the obtained charge curve and the discharge curve.

2. The electronic apparatus of claim 1, wherein, when the charge current of the battery corresponds to a preset first magnitude or higher, the processor is further configured to:
fully charge the battery and discharge the fully-charged battery to obtain the discharge curve, and
charge the battery, when the battery is fully discharged, to obtain the charge curve.

3. The electronic apparatus of claim 2, wherein the processor is further configured to obtain the discharge curve and the charge curve at or below a preset discharge speed and charge speed.

4. The electronic apparatus of claim 1, further comprising a display configured to display a state of progress on work of the charge curve and the discharge curve.

5. The electronic apparatus of claim 1, further comprising:
a communicator configured to transmit the obtained charge curve and the obtained discharge curve to an external apparatus,
wherein, when receiving a charge profile in response to the transmission of the charge curve and the discharge curve, the processor is further configured to control the power supply to charge the battery using the received charge profile.

6. The electronic apparatus of claim 1, wherein the processor is further configured to obtain the plurality of charge profiles corresponding to a plurality of charge modes, respectively, using the obtained charge curve and the obtained discharge curve.

7. The electronic apparatus of claim 1, wherein, when receiving power from an external adaptor, the processor is further configured to:
determine a charge mode based on a state of a charge of the battery and pre-stored user's pattern information, and
control the power supply to charge the battery with a charge profile corresponding to the determined charge mode.

8. The electronic apparatus of claim 7, wherein the charge mode comprises at least one of high-speed charge mode, a lifespan-extension charge mode, and a power-save charge mode.

9. The electronic apparatus of claim 8,
wherein the high-speed charge mode is a charge mode in which a plurality of charge segments are divided according to the state of the charge of the battery,
wherein a charge profile is used such that, for each of the divided charge segments, different target voltages and a target current are provided to the battery, and wherein the charge profile is determined based on the different target voltages and a preset power consumption.

10. The electronic apparatus of claim 8, wherein the lifespan-extension charge mode uses a charge profile in which a time of charging current is varied in a default charge profile based on a lifespan of the battery.

11. The electronic apparatus of claim 8, wherein the power-save charge mode is a charge mode that uses a charge profile having a charge idle segment.

12. The electronic apparatus of claim 11, wherein the charge idle segment is a segment determined according to a preset time for terminating the charging of the battery and a time necessary for charging the battery.

13. The electronic apparatus of claim 11, wherein the charge idle segment is allocated in an initial stage of the battery charging or allocated when a charge capacity of the battery exceeds a preset capacity.

14. A method for controlling charge of an electronic apparatus, the method comprising:
 fully charging a battery to obtain a charge curve expressed in time an amount of and charge current;
 fully discharging the battery to obtain a discharge curve expressed in time an amount of and charge current;
 obtaining a state information of the battery based on the obtained charge curve and the obtained discharge curve,
 obtaining a charge profile corresponding to the state information of the battery among a plurality of charge profiles stored in a memory; and
 charging the battery by providing a constant voltage or a constant current to the battery using the charge profile,
 wherein the obtaining of the battery state information includes capacity information of the battery, lifespan information, and information on a time taken for charging, using the obtained charge curve and the discharge curve.

15. The method of claim 14, wherein the obtaining of the charge curve and the discharge curve comprises:
 fully charging the battery when the charge current of the battery corresponds to a preset first magnitude or higher;
 discharging the fully-charged battery to obtain the discharge curve; and
 charging the battery when the battery is fully discharged to obtain the charge curve.

16. The method of claim 14, wherein the charging of the battery comprises:
 determining, when being inputted with power from an external adaptor, a charge mode based on a state of a charge of the battery and pre-stored user's pattern information; and
 charging the battery with a charge profile corresponding to the determined charge mode.

17. The method of claim 16,
 wherein the charge mode comprises a high-speed charge mode in which a plurality of charge segments are divided according to the state of the charge of the battery,
 wherein a charge profile is used such that, for each of the divided charge segments, different target voltages and a target current are provided to the battery, and
 wherein the charge profile is determined based on the different target voltages and a preset power consumption.

18. The method of claim 16, wherein the charge mode comprises a power-save charge mode that uses a charge profile having a charge idle segment determined based on a preset time for terminating the charging of the battery and a time necessary for charging the battery.

19. A non-transitory computer readable recording medium comprising a program, wherein executing the program implements a controlling method, the method comprising:
 fully charging a battery to obtain a charge curve expressed in time an amount of and charge current;
 discharging the battery to obtain a discharge curve expressed in time an amount of and charge current;
 obtaining a state information of the battery based on the obtained charge curve and the obtained discharge curve,
 obtaining a charge profile corresponding to the state information of the battery among a plurality of charge profiles stored in a memory; and
 charging the battery by providing a constant voltage or a constant current to the battery using the charge profile,
 wherein the obtaining of the battery state information includes capacity information of the battery, lifespan information, and information on a time taken for charging, using the obtained charge curve and the discharge curve.

* * * * *